US010926236B2

(12) United States Patent
Cave

(10) Patent No.: US 10,926,236 B2
(45) Date of Patent: Feb. 23, 2021

(54) REACTOR

(71) Applicant: THE NOTTINGHAM TRENT UNIVERSITY, Nottingham (GB)

(72) Inventor: Gareth Cave, Nottingham (GB)

(73) Assignee: THE NOTTINGHAM TRENT UNIVERSITY, Nottingham (GB)

( * ) Notice: Subject to any disclaimer, the term of this patent is extended or adjusted under 35 U.S.C. 154(b) by 158 days.

(21) Appl. No.: 15/754,751

(22) PCT Filed: Aug. 24, 2016

(86) PCT No.: PCT/GB2016/052622
§ 371 (c)(1),
(2) Date: Feb. 23, 2018

(87) PCT Pub. No.: WO2017/033005
PCT Pub. Date: Mar. 2, 2017

(65) Prior Publication Data
US 2018/0280910 A1 Oct. 4, 2018

(30) Foreign Application Priority Data
Aug. 24, 2015 (GB) ..................................... 1515000

(51) Int. Cl.
B01F 5/22 (2006.01)
B01J 13/00 (2006.01)
(Continued)

(52) U.S. Cl.
CPC ........... B01J 13/0047 (2013.01); B01F 5/221 (2013.01); B01F 7/00875 (2013.01);
(Continued)

(58) Field of Classification Search
CPC ... B01F 5/221; B01F 7/00875; B01J 13/0047; B01J 13/0021; B01J 13/0043; B01J 19/122
See application file for complete search history.

(56) References Cited

U.S. PATENT DOCUMENTS 5,374,672 A * 12/1994 Chaverot ................ B01F 7/025
422/258
6,858,189 B1 2/2005 Ramshaw et al.
2010/0243947 A1 9/2010 Enomura

FOREIGN PATENT DOCUMENTS

EP 2193865 A1 9/2010
GB 846190 A 8/1958
WO 0048732 8/2000

OTHER PUBLICATIONS

Smith, Synthesis of Magnetic Nanoparticles Using Spinning Disc Processing, Australia, 2006.
(Continued)

Primary Examiner — Nicholas E Hill
(74) Attorney, Agent, or Firm — Allan Watts PLLC

(57) ABSTRACT

The invention relates to an apparatus and methods for producing liquid colloids such as suspensions of nanoparticles, in which liquid feedstock materials are reacted on a reaction surface of a rotatable plate. The apparatus has a first plate (101) mounted for rotation about a rotation axis (102), the first plate (101) providing a reaction surface (103) having a concave portion; first (106) and second (107) inlet lines arranged to introduce respective first and second liquid feedstock materials to the reaction surface (103); and a collection unit (110) arranged to collect a reaction product formed from reaction of the liquid feedstock materials as a liquid colloid ejected from an outer edge of the plate (101).

20 Claims, 16 Drawing Sheets

(51) Int. Cl.
*B01J 19/18* (2006.01)
*B01J 19/12* (2006.01)
*B01F 7/00* (2006.01)
*C01F 11/02* (2006.01)
*C01G 49/08* (2006.01)

(52) U.S. Cl.
CPC ....... *B01J 13/0021* (2013.01); *B01J 13/0043* (2013.01); *B01J 19/122* (2013.01); *B01J 19/123* (2013.01); *B01J 19/125* (2013.01); *B01J 19/126* (2013.01); *B01J 19/127* (2013.01); *B01J 19/128* (2013.01); *B01J 19/18* (2013.01); *B01J 19/1806* (2013.01); *B01J 19/1887* (2013.01); *C01F 11/02* (2013.01); *C01G 49/08* (2013.01)

(56) References Cited

OTHER PUBLICATIONS

Cave, ISR and WO2017033005 (Parent of current Application and ISR thereof), PCT/GB2016/052622.

\* cited by examiner

REACTOR

CROSS-REFERENCE TO RELATED APPLICATIONS

This patent application is a national stage application under 35 U.S.C. 371 of, and claims priority to, International Application No. PCT/GB2016/052622, filed on Aug. 24, 2016, which claims priority to Great Britain (GB) Application No. 1515000.6, filed on Aug. 24, 2015. These two priority patent applications are incorporated herein by reference.

FIELD OF THE INVENTION

The invention relates to an apparatus and methods for producing liquid colloids such as suspensions of nanoparticles, in which liquid feedstock materials are reacted on a reaction surface of a rotatable plate.

BACKGROUND

The use of spinning disc reactors (SDRs) as a method of producing nanoparticles is known, for example as described by Smith et al in "Synthesis of Magnetic Nanoparticles Using Spinning Disc Processing", NSTI-Nanotech 2006, Vol. 1, pp 343-346, 2006. SDRs have an advantage over traditional co-precipitation methods in allowing for a closer control over the reaction time, and thereby allowing for a more uniform particle size distribution. A particular goal of many methods of fabricating nanoparticles is the creation and control of a substantially monodisperse material, i.e. having a uniform and controlled particle size. Although SDR methods have shown some promise in reaching these goals, the methods have not achieved widespread adoption due to actual or perceived difficulties in producing required results and in scaling up production quantities.

Typical SDRs comprise a flat spinning plate on to which feedstock materials are applied. A reaction between the materials occurs as the materials traverse the surface of the disc, forming reaction products that are then ejected from the edge of the plate. Although a certain degree of control is possible using SDRs, for example by varying the rotational speed or temperature of the disc, this control is limited and can prevent SDRs from being considered when scaling up production of nanoparticles.

It is an object of the invention to address one or more of the above mentioned problems.

SUMMARY OF THE INVENTION

In accordance with a first aspect of the invention there is provided an apparatus for producing a liquid colloid, the apparatus comprising: a first plate mounted for rotation about a rotation axis, the first plate providing a reaction surface having a concave portion; first and second inlet lines arranged to introduce respective first and second liquid feedstock materials to the reaction surface; and a collection unit arranged to collect a reaction product formed from reaction of the liquid feedstock materials as a liquid colloid ejected from an outer edge of the plate.

Providing a reaction surface having a concave portion, allows the residence time of the reactants over the reaction surface to be more closely controlled, for example by selecting an optimum degree of concavity of the concave portion. The concave portion may be a concave conical portion. In this case, the residence time of the reactants can be controlled by selecting an optimum angle for the conical surface relative to the rotation axis.

Optionally, the reaction surface further comprises a side wall portion extending from the concave portion.

Optionally, the side wall portion is conical.

Optionally, a surface of the side wall portion is smooth.

Optionally, the surface of the side wall portion comprises at least one groove.

Optionally, the surface of the side wall portion comprises at least one guiding member extending between the concave portion and an outer edge of the side wall portion.

Optionally, the guiding member is protruding from the surface of the side wall portion.

Optionally, the concave portion of the reaction surface comprises a plurality of grooves or ridges. The grooves may be concentric grooves. Applying grooves or ridges to the reaction surface can enhance mixing and reaction of the feedstock materials.

In some embodiments, the reaction surface of the plate may comprise an array of raised structures such as pillars, nodules, or fibres. These structures can enhance mixing and provide a greater reaction surface area.

Optionally, the first and second inlet lines are located above the first plate at a distance apart from the reaction surface.

Optionally, the first plate is mounted to an end of a first rotatable axle for rotation about the rotation axis.

Optionally, the first and/or second inlet lines extend along the first rotatable axle.

Optionally, the apparatus comprises a second plate mounted for rotation about the rotation axis, wherein the apparatus is configured to translate the first and/or second plates along the rotational axis to form a reaction volume between the reaction surfaces of the first and second plates into which the first and second inlet lines are arranged to introduce the first and second liquid feedstock materials.

The second plate can serve a number of purposes, such as to act as a secondary reaction surface and to contain the materials in a closely defined reaction volume, thereby maintaining a greater degree of control over the reaction conditions.

Optionally, the second plate is mounted to an end of a second rotatable axle for rotation about the rotation axis, wherein the second inlet line or a third inlet line extends along the second rotatable axle for introducing the second liquid feedstock material or a third liquid feedstock material into the reaction volume.

Having an inlet line provided along the second rotatable axle allows for more flexibility in introducing feedstock materials and other liquids. The third liquid feedstock material may, for example, be a material for providing a coating on particles resulting from reaction of the first and second feedstock materials.

Optionally, the apparatus is configured to rotate the first and second plates in opposing directions.

Rotating in opposing directions allows for shearing forces and turbulence to be set up between the opposing reaction surfaces of the first and second plates, resulting in improved mixing of the feedstock materials in the reaction volume.

Optionally, the apparatus at the same or different rotational speeds. The second plate may optionally be held stationary.

Optionally, the reaction surface of the first plate and the reaction surface of the second plate have co-operating shapes.

Optionally, the reaction surface of the second plate comprises a protruding conical portion.

Optionally, the reaction surface of the second plate comprises a protruding frustoconical portion.

Optionally, the reaction surface of the second plate has a side wall portion surrounding the protruding conical or frustoconical portion.

Optionally, the first and second inlet lines extend through the first plate so as to introduce respective first and second liquid feedstock materials to the reaction surface.

By providing feedstock materials via first and second inlet lines through the plate, reactions can be more easily controlled. In particular for reactions that proceed quickly, introducing the reactants directly at the reaction surface allows the time over which the reactants are together to be more closely controlled. Introducing the feedstock materials through the plate allows for a more precise control of how the materials are introduced to the reaction surface while the plate is rotating, and thereby enables more control over the sequence of reactions across the reaction surface.

Optionally, the first and second inlet lines are arranged to introduce respective first and second liquid feedstock materials on the reaction surface of the first plate at different radii from the rotation axis.

Introducing the feedstock material at different radii allows for more control over mixing of the materials, since the materials will mix over a defined range of the reaction surface. Positioning the inlets at different radii on the reaction surface also allows for multiple sequential reactions to take place on the reaction surface. This has a particular benefit for the production of nanoparticles, where reactions resulting in the formation of particles can proceed very quickly and a narrow range of particle size is typically beneficial and typically a further coating reaction is required to form a stable colloid.

According to a second aspect of the invention there is provided an apparatus for producing a liquid colloid, the apparatus comprising: a first plate mounted for rotation about a rotation axis, the first plate having a top and a bottom surface, wherein the bottom surface comprises a reaction surface; first and second inlet lines extending through the first plate and arranged to introduce respective first and second liquid feedstock materials to the reaction surface; a motor adapted to rotate the first plate around the rotation axis at a velocity that is sufficient to retain the first and second liquid feedstock on the reaction surface upon injection; and a collection unit arranged to collect a reaction product formed from reaction of the liquid feedstock materials as a liquid colloid ejected from an outer edge of the plate.

By providing a motor adapted to rotate the first plate around the rotation axis at a velocity that is sufficient to retain the first and second liquid feedstock on the reaction surface of the bottom surface; it is possible to minimize potential clogging of particles and therefore to produce a narrowly dispersed reaction product. Optionally, the velocity is greater than about 10 000 rpm.

Optionally, the velocity ranges from about 10 000 rpm to 30 000 rpm.

Optionally, the first plate is mounted to an end of a first rotatable axle for rotation about the rotation axis.

Optionally, the first and/or second inlet lines extend along the first rotatable axle.

Optionally, the reaction surface of the first plate comprises a protruding conical or frustoconical portion.

Optionally, the reaction surface of the first plate has a side wall portion surrounding the protruding conical or frustoconical portion.

Optionally, the reaction surface comprises at least one of a groove and a guiding member.

Optionally, the reaction surface comprises a concave portion.

Optionally, the apparatus further comprises a side wall portion extending from the concave portion.

Optionally, the side wall portion is conical.

Optionally, a surface of the side wall portion is smooth.

Optionally, the surface of the side wall portion comprises at least one groove.

Optionally, the surface of the side wall portion comprises at least one guiding member extending between the concave portion and an outer edge of the side wall portion.

Optionally, the guiding member is protruding from the surface of the side wall portion.

Optionally, the concave portion of the reaction surface comprises a plurality of concentric grooves.

Optionally, the apparatus comprises a second plate mounted for rotation about the rotation axis, the second plate having a reaction surface, wherein the apparatus is configured to translate the first and/or second plates along the rotational axis to form a reaction volume between the reaction surfaces of the first and second plates into which the first and second inlet lines are arranged to introduce the first and second liquid feedstock materials.

Optionally, the second plate is mounted to an end of a second rotatable axle for rotation about the rotation axis, wherein the second inlet line or a third inlet line extends along the second rotatable axle for introducing the second liquid feedstock material or a third liquid feedstock material into the reaction volume.

Optionally, the apparatus is configured to rotate the first and second plates in opposing directions.

Optionally, the reaction surface of the first plate and the reaction surface of the second plate have co-operating shapes.

Optionally, the first and second inlet lines are arranged to introduce respective first and second liquid feedstock materials on the reaction surface of the first plate at different radii from the rotation axis.

Optionally, the first inlet line is arranged to introduce the first liquid feedstock material on the reaction surface of the first plate at the rotation axis and the second input line is arranged to introduce the second liquid feedstock on the reaction surface of the first plate between the side wall portion and the protruding conical or frustoconical portion.

Optionally, according to any preceding aspects of the invention, the reaction surface of at least one of the first and second plate is composed of a moulded polymeric, ceramic or glass material.

Optionally, according to any preceding aspects of the invention, at least one of the first and second plate is composed of the moulded polymeric, ceramic or glass material.

In some embodiments the reaction surface of the first plate (and/or the second plate if present) may be composed of a metal. The first and/or second plate may be composed of the same or different material as the first plate.

The material of the first and second plates (including any raised structures, if present) may be coated with a catalytic material to promote reactions on the surface.

Optionally, according to any preceding aspects of the invention, at least one of the first and second plate is transparent or translucent to visible, infrared or ultraviolet light, microwaves, X-rays, gamma rays or other wavelength of electromagnetic radiation. This allows for reactions of the feedstock materials to be at least partially controlled by incident light or other electromagnetic radiation over the reaction surface or reaction volume. Visible, infrared or ultraviolet light sources such as light emitting diodes (LEDs) may for example be incorporated into the plate or be provided external to the plate.

In some embodiments, the apparatus according to any preceding aspects of the invention, may comprise an ultrasonic generator arranged and configured to apply ultrasonic energy to the first and/or second plates, for example by applying ultrasonic vibrations to the first or second plates via the respective rotatable axle. Applying ultrasonic energy can improve mixing of the reactant fluids via high frequency agitation.

Optionally, according to any preceding aspects of the invention, the collection unit comprises a sealable vessel having an inner wall for collecting the reaction product and a product outlet configured to allow the reaction product to be removed from the vessel. The reaction product may be removed via gravity, pumping or through the use of a back flow regulator.

Optionally, the apparatus according to any preceding aspects of the invention comprises a fluid inlet arranged for spraying liquid against the inner wall of the sealable vessel during collection of the reaction product.

This allows for the reaction to be stopped at the point the reaction products are ejected from the plate, and the reaction products to be diluted to the appropriate level immediately on collection. The liquid may be sprayed against the inner wall of the sealable vessel during collection. The liquid may for example incorporate a chemical to coat or stabilise the reaction products ejected from the plate.

Optionally, the inner wall of the sealable vessel is temperature controllable, thereby allowing for control over the reaction once the reactant product is ejected from the plate. The sealable vessel may for example comprise a fluid inlet and outlet for passage of a temperature controlled liquid such as oil around the inner wall of the vessel.

Optionally, the sealable vessel is separable into two parts by separation along the rotation axis, thereby allowing for ease of disassembly of the apparatus.

According to a third aspect of the invention there is provided a method of forming a liquid colloid using the apparatus according to any preceding aspects of the invention, the method comprising: rotating the first plate about the rotation axis; providing the first and second liquid feedstock materials to the reaction surface of the first plate via the first and second inlet lines; transforming the feedstock materials to the reaction product over the reaction surface of the first plate; and collecting the reaction product with the collection unit as a liquid colloid ejected from the outer edge of the plate.

Optionally, the reaction product comprises a liquid suspension of solid particles.

Optionally, the solid particles have a volumetric size distribution with a mode of between 1 and 100 nm.

Optionally, the solid particles have a volumetric size distribution with a mode of between 5 and 35 nm.

Optionally, the solid particles comprise or are composed of a metal oxide, an alloy, a pure metal or a polymer.

Optionally, rotating the first plate is performed at a velocity of at least about 10 000 rpm.

Optionally, rotating the first plate is performed at a velocity ranging from about 10 000 rpm to 30 000 rpm.

DETAILED DESCRIPTION

The invention is described in further detail below by way of example and with reference to the accompanying drawings, in which:

FIG. 7b is another perspective view of the rotatable plate of FIG. 7a;

FIG. 9b is another perspective view of the rotatable plate of FIG. 9a;

FIG. 10b is another perspective view of the rotatable plate of FIG. 10a;

FIG. 11b is another perspective view of the rotatable plate of FIG. 11a;

FIG. 12b is another perspective view of the rotatable plate of FIG. 12a;

Figure 1:
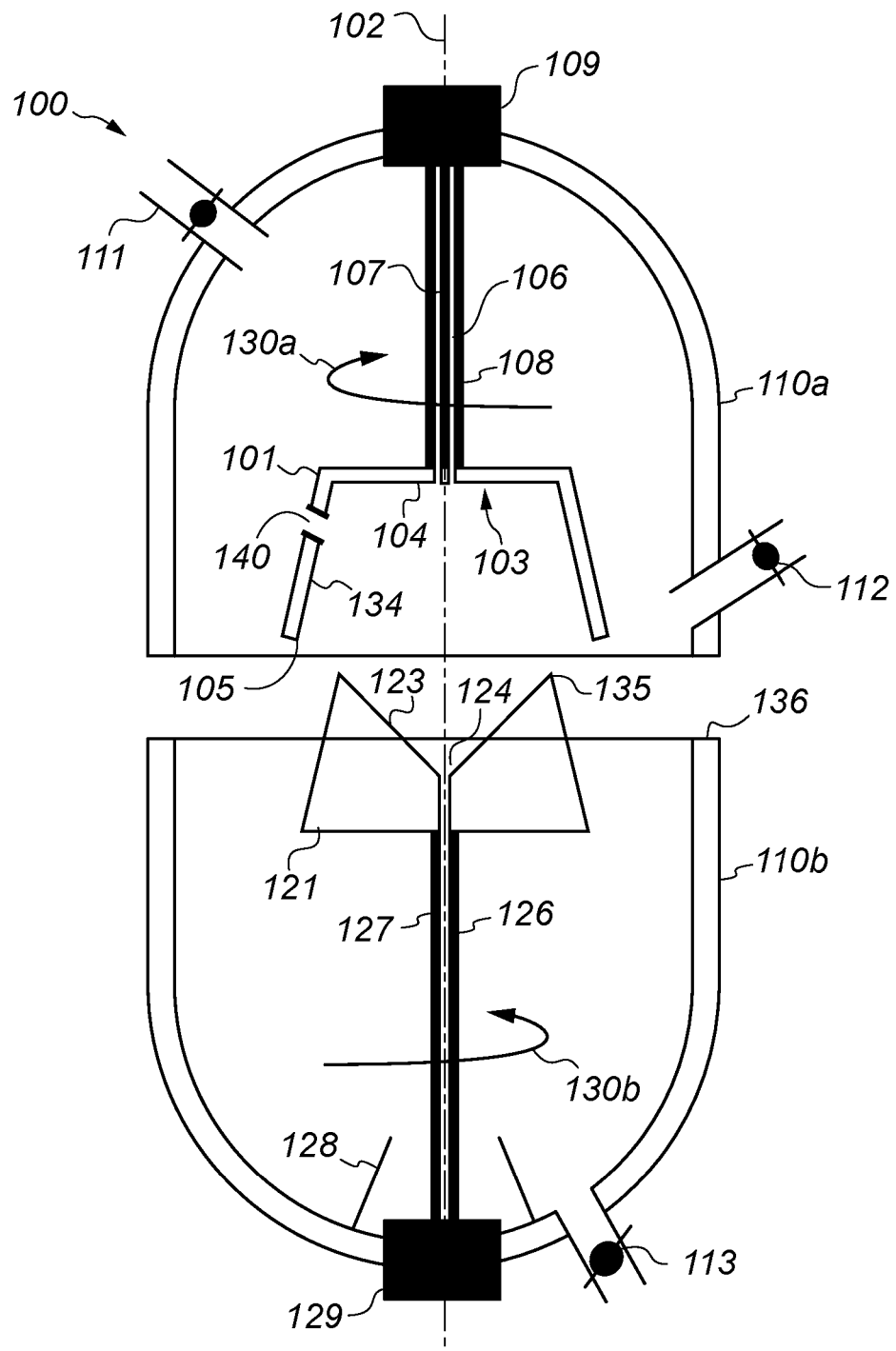
FIG. 1 is a schematic diagram of an exemplary apparatus for producing liquid colloids.

FIG. 1 illustrates schematically an apparatus 100 according to an embodiment of the invention. The apparatus 100 comprises a first plate 101 mounted for rotation about a rotation axis 102. The first plate 101 has a reaction surface 103 with an inner portion 104 and an outer edge 105. First and second inlet lines 106, 107 are arranged to introduce respective first and second liquid feedstock materials to the reaction surface 103, the inlet lines 106, 107 extending through the plate 101. The inlet lines 106, 107 have openings arranged to allow for the feedstock materials to be introduced on to the inner portion 104 of the reaction surface 103 at or proximal to the centre of the plate 101, i.e. at or proximal to the rotation axis 102. In this exemplary embodiment, the inlet lines 106, 107 extend along and within a rotatable axle 108 on which the first cylinder 101 is mounted. The rotatable axle 108 is mounted to a bearing 109 and is driven by a motor external to the apparatus (not shown). The inlet lines 106, 107 may be provided along a fixed inner portion within the rotatable axle 108 such that the inlet lines 106, 107 do not themselves rotate with the axle 108. Alternatively, the inlet lines 106, 107 may rotate along with the rotatable axle 108, and an interface such as a rotating union joint provided to connect each of the rotating lines with a static fluid feed line outside the vessel 110. Such an interface may alternatively be provided within the vessel adjacent to the plate, such that the inlet lines do not extend along the rotatable axle. Channels may be provided in the plate 101 to allow passage of fluids from the inlet lines 106, 107 to the reaction surface 103. Liquids may be fed through the inlet lines 106, 107, 127 by means of pumps such as peristaltic pumps (which are useful for controlled low flow rates and reduce the possibility of contamination), with a back flow regulator if required. In addition an inlet 140 may be provided through plate 101 for introduction of a fluid or a suspension of solid material such as a coating material for applying to particles produced by reaction of the first and second feedstock materials on the reaction surface 103 of plate 101.

The apparatus 100 comprises a collection unit in the form of a vessel 110 surrounding the plate 101. In this exemplary embodiment, the vessel is divided into two parts 110a, 110b, which are separable along the rotation axis 102 to allow access to the plate 101. The sealable vessel allows the plate 101 to be kept under controlled environmental conditions, such as under a controlled atmosphere. A gas inlet 111 and gas outlet 112 are provided in the vessel walls to allow gas to be introduced and withdrawn from the interior of the vessel 110. A collection port 113 is provided towards the bottom of the vessel 110 for extracting reaction products.

Although the apparatus 100 will function with only one plate 101, in preferred embodiments the apparatus comprises a second plate 121, preferably also mounted for rotation about the same rotation axis 102. In the embodiment shown, the second plate 121 is also mounted to the end of a second rotatable axle 126. As shown, the second rotatable axle 126 is mounted on a bearing 129 and driven by a motor (not shown) external to the vessel 110. A further inlet line 127 may be provided, which in the embodiment shown is within the second rotatable axle 126. The further inlet line 127 may be used, for example, to introduce a further liquid material such as a coating material for applying to particles produced by reaction of the first and second feedstock materials on the reaction surface 103 of the first plate 101. The further inlet line 127 may have an opening at or proximal to the centre of the second plate, i.e. at or proximal to the rotation axis 102. The concave conical shape of the surface 123 of the second plate 121 allows for the further liquid material to be uniformly applied to the reaction surface 103 of the first plate 101 prior to ejection of material from the outer edge 105 of the first plate 101, thereby ensuring a uniform application of material to the reaction product on the first plate 101

A baffle 128 is preferably provided around the bearing end of the second axle 126 to direct reaction product away from the bearing and towards the outlet 113.

The first and second plates 101, 121 are preferably driven by their respective motors in opposite directions, as indicated by arrows 130a, 130b, although may be driven in the same direction and/or at different speeds.

In a first operation mode, first and second feedstock materials are introduced at or near the centre of the inner portion 104 of the reaction surface 103 of the first plate 101 while the plate 101 is rotating. For example the plate 101 may be rotating at a speed of 10 000 to 30 000 rpm. At such speeds, the first and second feedstock materials mix on the reaction surface 103 and form a reaction product, such as a nanoparticulate material as the materials travel along the reaction surface 103 away from the rotation axis 102. The mixture then reaches an outer portion 134 of the reaction surface 103, which in the embodiment shown is of concave conical form. This allows the further liquid material expelled from the outer edge 135 of the rotating second plate 121 to mix with the reaction product, for example by forming a coating on the nanoparticulate material, before the reaction product is expelled from the outer edge 105 of the reaction surface 103 of the first plate 101. The apparatus 100 may be oriented in use such that the reaction surface 103 of the first plate 101 faces upwards or downwards, or in any orientation in between, depending on the particular combination of plates and liquid feedstocks used. If, for example, a coating material is to be introduced via the second plate 121, the orientation as shown in FIG. 1 may be used, since this allows for the coating liquid to be drawn outwards from the inlet line 127 and expelled from the edge 135 due to rotation of the second plate 121. The first and second liquid feedstock materials react as they pass along the reaction surface 103 of the first plate due to rotation of the first plate 101, being held on the surface 103 by wetting. As the reaction products pass towards the outer edge 105 of the first plate, the coating material ejected from the edge 135 of the second plate 121 mixes with the reaction products and produces a finished product that is then ejected from the edge 105 and on to the inner wall of the vessel 110. The orientation as shown in FIG. 1 may be more suitable when the amount of liquid material provided via the inlet line 127 is substantially greater than that provided along inlet lines 106, 107, and/or where it is important that the liquid provided along inlet line 127 does not mix until the reaction products are formed. For example, when undertaking sequential reactions such as synthesising nanoparticles followed by coating the particles, or forming soft nanoparticles followed by a curing process, the order in which the liquid feedstocks are introduced needs to be controlled. The use of a second plate has a particular advantage in that it allows for a further liquid to be introduced without causing turbulent flow that would otherwise result in some liquid leaving the first plate without the coating liquid having been applied.

By mixing the first and second feedstock materials against on the reaction surface 103—first operation mode—it is possible to minimize potential clogging of particles and therefore to produce a narrowly dispersed reaction product.

In a second operation mode, first and second feedstock materials are introduced at or near the centre of the inner portion 124 of the reaction surface 123 of the first plate 121 while the plate 121 is rotating and plate 101 is kept static. In this case the first and second feedstock materials mix on the reaction surface 123 and form a reaction product, such as a nanoparticulate material as the materials travel along the reaction surface 123 away from the rotation axis 102. The mixture then reaches an outer portion 135 of the reaction surface 123. The mixture expelled then reaches the outer portion 134 of plate 101. Plate 101 is then used for functionalising the mixture by introducing a fluid or a suspension of solid material via inlet 140. For example, coating the formed nano particle (e.g. Fe3O4) with a capping agent (e.g citric acid) in situ". The conical shape of the inner portion of the second plate 121 helps in preventing the liquid introduced via inlet line 127 flowing off the edge of the plate and also increases the retention time while retaining a small footprint. Liquid introduced to the surface of the second plate 121 preferably only progresses to the outer edge 135 under the action of rotation of the second plate 121.

The complementary shapes of the plates, in particular the convex outer edge of the second plate 121 and the concave outer edge of the first plate 101, allows for an increased level of control in that the closer the opposing surfaces can be the less any reactions will occur out of order. The gap between the opposing surfaces of the plates 101, 121 may be controlled and adjusted to result in different reaction volumes and optionally different shear forces to induce or promote desired chemical reactions and/or heat.

The exemplary apparatus 100 illustrated in FIG. 1 is shown with the two parts 110a, 110b of the vessel separated. In use, the two parts 110a, 110b are brought together along the rotation axis 102, bringing the plates 101, 121 closer to each other and forming a seal along a join 136 between the two parts 110a, 110b. The atmosphere of the interior of the vessel 110 can then be maintained, for example by controlling the gas or gases present in the vessel and the pressure within the vessel, both of which can be used to affect the reaction processes.

Figure 2:
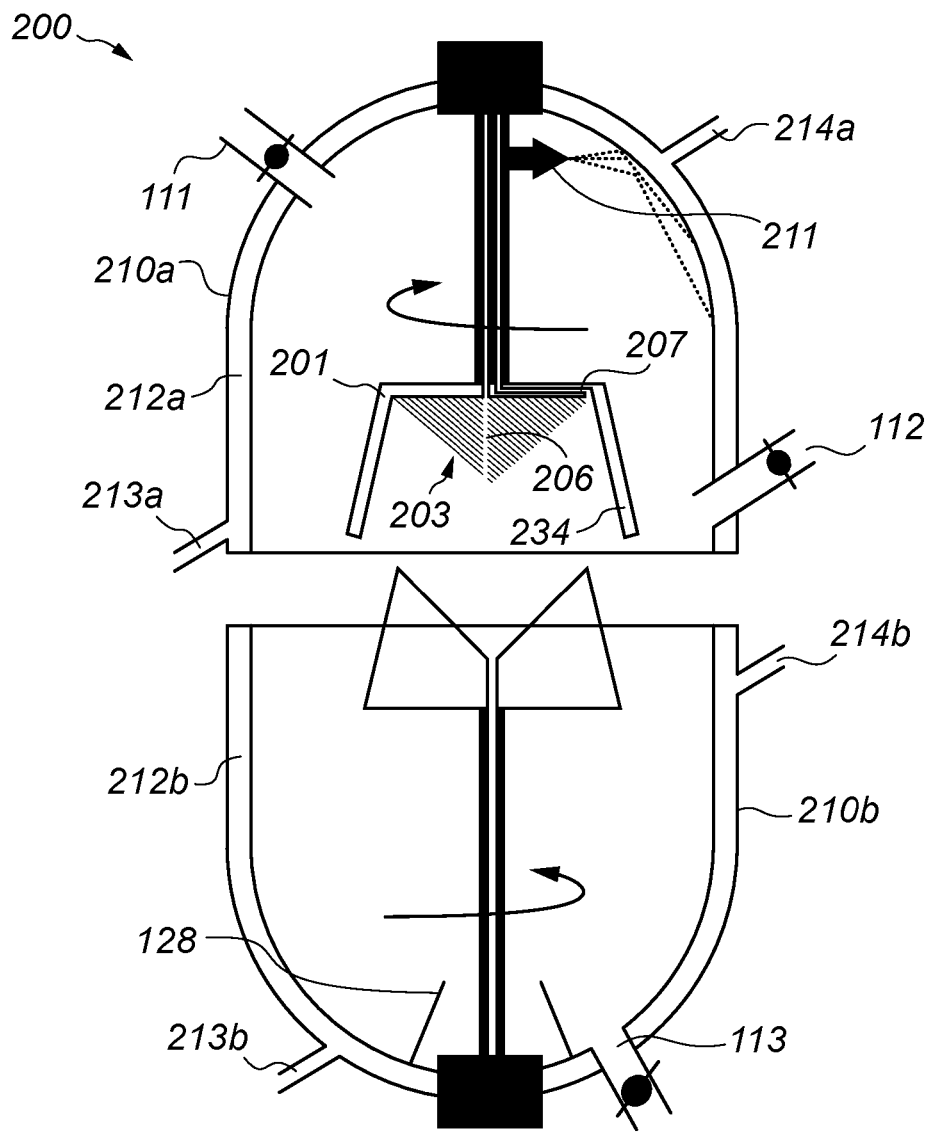
FIG. 2 is a schematic diagram of an alternative exemplary apparatus.

FIG. 2 illustrates an alternative embodiment of an apparatus 200 to that illustrated in FIG. 1, in which certain parts of the apparatus 200 have been modified. Other components have reference numerals as indicated above and shown in FIG. 1.

A further liquid feed inlet is provided in the apparatus 200, which is configured to apply a spray 211 of liquid to the interior of the vessel 110. The further liquid feed inlet may be provided on the outside of the first rotatable axle and configured such that a spray around the interior of the vessel 110 is provided when the apparatus is operational. The spray 211 may, for example, rotate with the axle 108 so that the liquid, typically water, is applied uniformly to the interior of the vessel 110. This water spray acts to wash reaction products down the interior wall of the vessel 210 towards the outlet 113.

The vessel 210 which, as with the apparatus in FIG. 1, is in two parts 210a, 210b, comprises a cavity 212a, 212b in each part to allow for thermostatic control of the interior surface of the vessel 210 by passing a heat transfer liquid through the cavities 212a, 212b. An inlet 213a, 213b and an outlet 214a, 214b in each part allows for each part to be temperature controlled by control of the temperature of the liquid passing through the cavities 212a, 212b. Oil may be used as the heat transfer liquid, although other temperature controlling liquids may alternatively be used depending on the required temperature. Water may, for example, be used in cases where control at temperatures lower than 100° C. is required.

The first plate 201 in the apparatus 200 in FIG. 2 is a modified version of the first plate 101 in FIG. 1, the modification involving the reaction surface 203 comprising a convex portion, with the first inlet line 206 extending through the plate 201 to an apex of the convex portion and the second inlet line 207 extending through the plate 201 to an outer edge of the convex portion. The convex portion may, as illustrated in FIG. 2, be in the shape of a cone. This configuration is expected to allow for a greater degree of control over the way the feedstock materials mix together as they pass along the reaction surface 203 of the first plate 201, because the feedstock material provided via the first inlet line 206 will already be uniformly spread around the surface when it meets the feedstock material at the outer edge of the convex portion. The reaction between the two materials then proceeds while the materials traverse the outer concave portion 234 of the reaction surface 203.

Figure 3A:
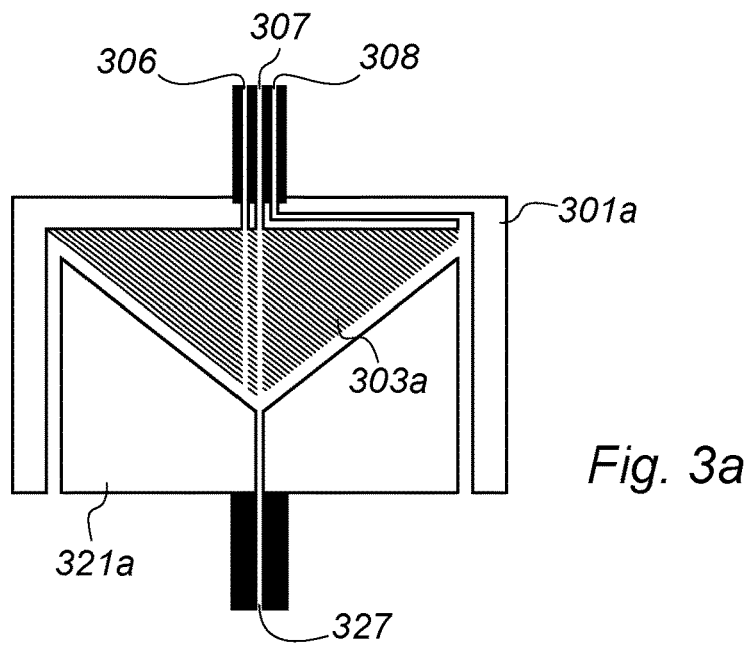
FIGS. 3a to 3f are schematic diagrams of exemplary arrangements of rotatable plates for use with the apparatus of FIG. 1 or 2.
Figure 3B:
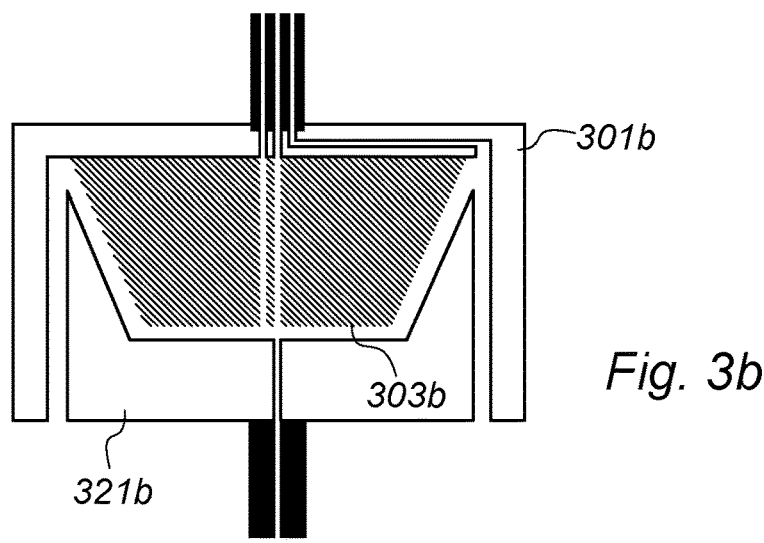
Figure 3C:
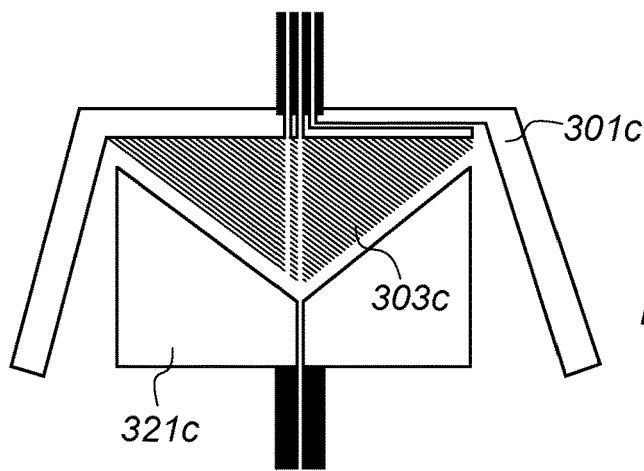

Alternative configurations for the first and second plates are illustrated in FIGS. 3a-3f. In FIG. 3a, the reaction surface 303a of the first plate 301a includes a convex conical surface between the inner portion and the outer edge of the first plate 301a. The reaction surface of the first plate also comprises an outer concave conical surface surrounding the convex conical surface. The second plate 321a includes a concave conical surface corresponding to the convex conical surface of the first plate. The surface of the second plate includes an outer convex conical surface surrounding the concave conical surface. The outer convex conical surface corresponds to the concave conical surface of the reaction surface of the first plate.

Figure 3D:
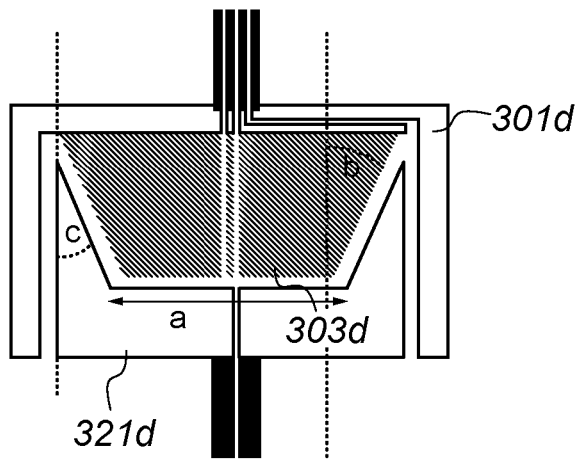
Figure 3E:
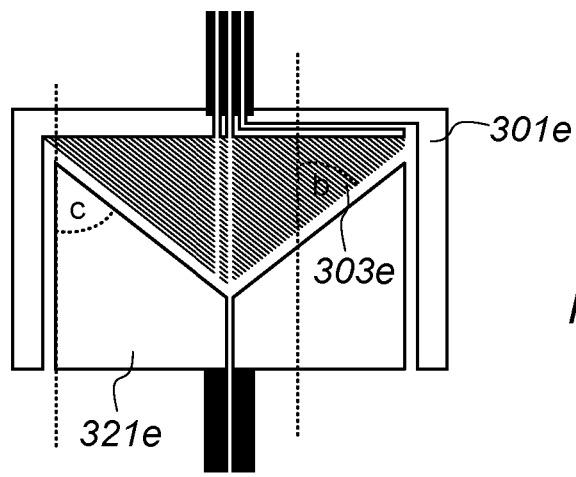
Figure 3F:
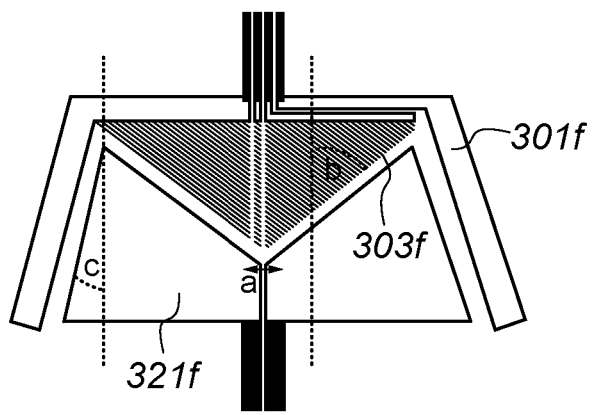

In each of the alternatives presented in FIGS. 3a-3f, two inlet lines 306, 307 extend through the rotatable axle and the plate to the centre of the reaction surface of the first plate 301a-f, and a third inlet line 308 extends to an outer edge of the convex portion of the reaction surface 303a-f. This allows for a further material, which may for example be a coating material, to be introduced along the third inlet line 308. In each case, the second plate 321a-f has an inlet line 327 extending through the plate, along which a coating material or other liquid feedstock may be introduced and mixed with the reaction products formed on the reaction surface 303a-f of the first plate 301a-f. The outer portion of the reaction surface 303a-f of the first plate 301a-f may be cylindrical, as in FIGS. 3a, 3b, 3d and 3e or may taper outwards towards the outer edge, as in FIG. 3c or 3f. The degree of taper can be used to control the residence time of the materials as they pass towards the outer edge, a higher degree of taper causing the materials to be ejected more quickly. The form of the inner portion of the reaction surface may be uniformly conical or convex, as in FIGS. 3a, 3c, 3e and 3f, or may be in the form of a truncated cone (or frustoconical) as in FIGS. 3b and 3d. The width of the truncated section (indicated as dimension a in FIG. 3d) may vary, for example depending on the angle (indicated as angle b in FIG. 3d) of the convex conical section of the reaction surface of the first plate. The angle of the convex conical surface to the rotational axis, which may for example be between 30 and 60 degrees, is preferably the same as the angle of the complementary concave conical surface of the second plate, as indicated in FIGS. 3d and 3e (in which angles b and c are equal). With the outer portion of the reaction surface tapering outwards, the corresponding surface of the second plate may have the same angle of taper, as in FIG. 3f, or may have a different angle, as in FIG. 3c. The angle of taper of the outer portion of the reaction surface may for example vary between 0 and 45 degrees.

Figure 4A:
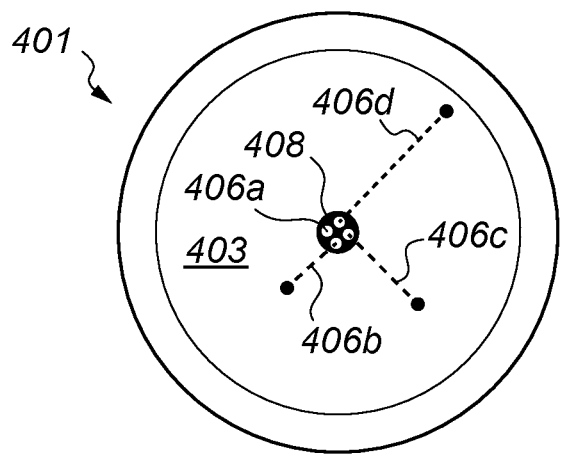
FIGS. 4a and 4b are schematic diagrams of an alternative exemplary arrangement of a rotatable plate.
Figure 4B:
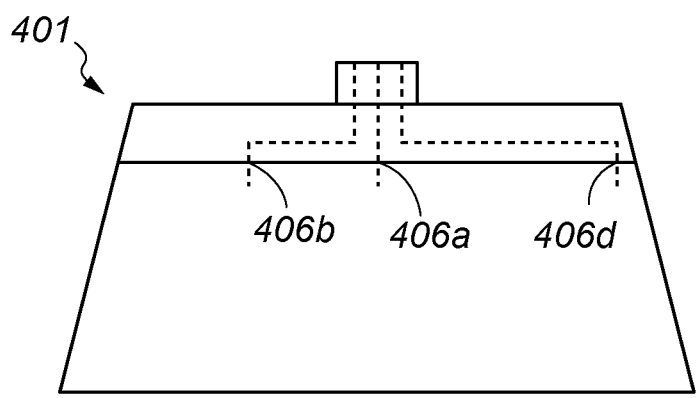

FIGS. 4a and 4b illustrate a further exemplary arrangement for a form of plate 401 in which a number of fluid feed lines 406a-d are indicated extending across the reaction surface 403 of the plate 401 to allow for fluid to exit from the feed lines 406a-d at different points across the reaction surface 403. In the embodiment shown, a first feed line 406a exits proximate the centre of the reaction surface, while second, third and fourth lines 406b-d exit at progressively increasing radii. Each of the feed lines 406a-d extend along the rotatable axle 408 to which the plate 401 is mounted and rotate along with the plate 401. An interface (not shown) such as a rotating union joint for connecting to static (i.e. non-rotating) fluid feed lines may be provided outside of the vessel within which the plate 401 and axle 408 are mounted for providing independent access to each of the rotating fluid feed lines 406a-d.

Figure 5:
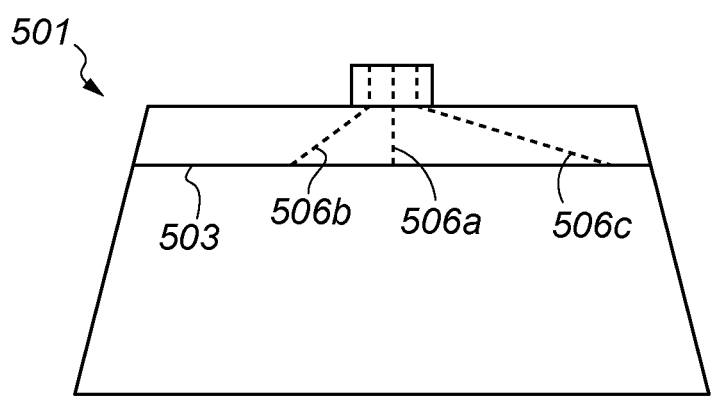
FIG. 5 is a schematic diagram of a further alternative exemplary arrangement of a rotatable plate.

FIG. 5 illustrates an alternative embodiment of a rotatable plate 501, in which the fluid feed lines 506a-c extend through the plate 501 at an angle with respect to the plane of the reaction surface 503.

FIGS. 6 to 12 show different designs for the rotating plate.

Figure 6A:
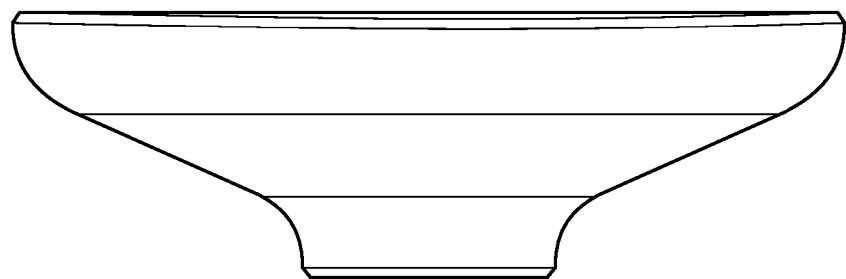
FIG. 6a is a side view of a rotatable plate for use with the apparatus of FIG. 1 or 2.
Figure 6B:
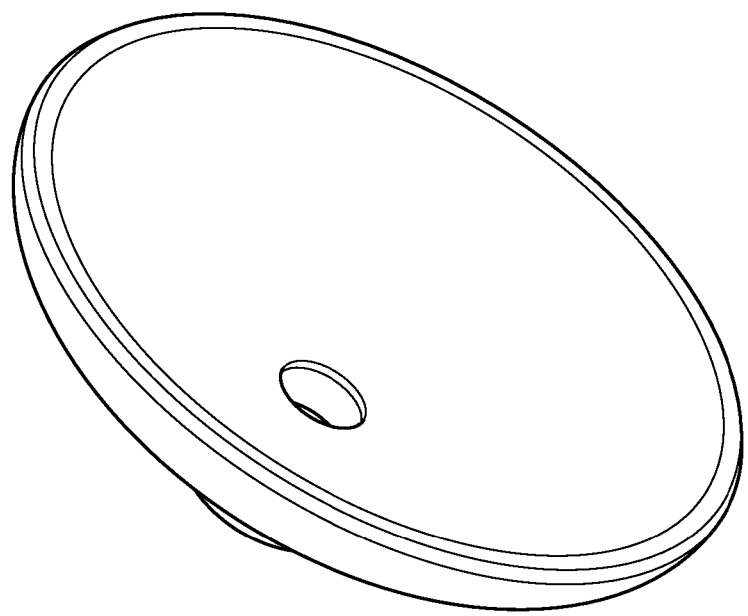
FIG. 6b is a perspective view of a rotatable plate for use with the apparatus of FIG. 1 or 2.

FIG. 6 shows a rotating plate having a bowl shape and a smooth concave reaction surface. The plate has an aperture located at the centre of the reaction surface. The retention time of the product mixture inside the plate can be increased by increasing the surface area of the reaction surface.

Figure 7A:
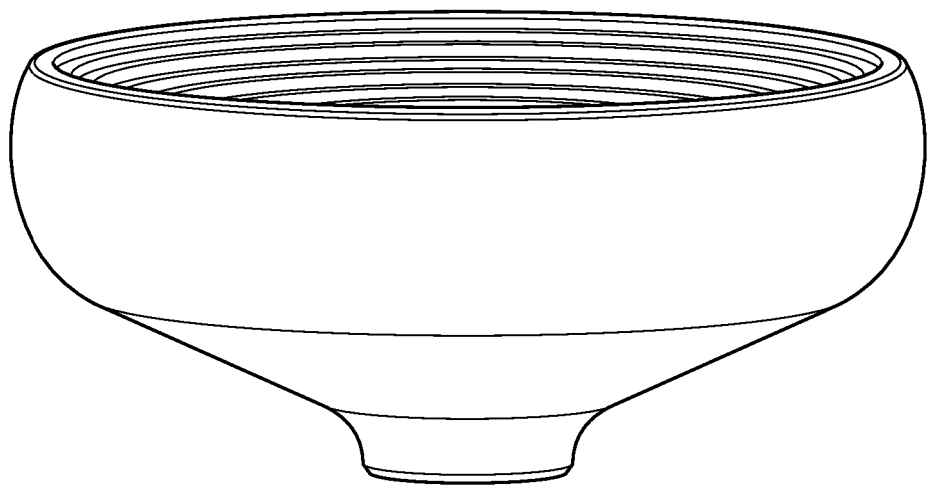
FIG. 7a is a perspective view of a rotatable plate for use with the apparatus of FIG. 1 or 2.
Figure 7B:
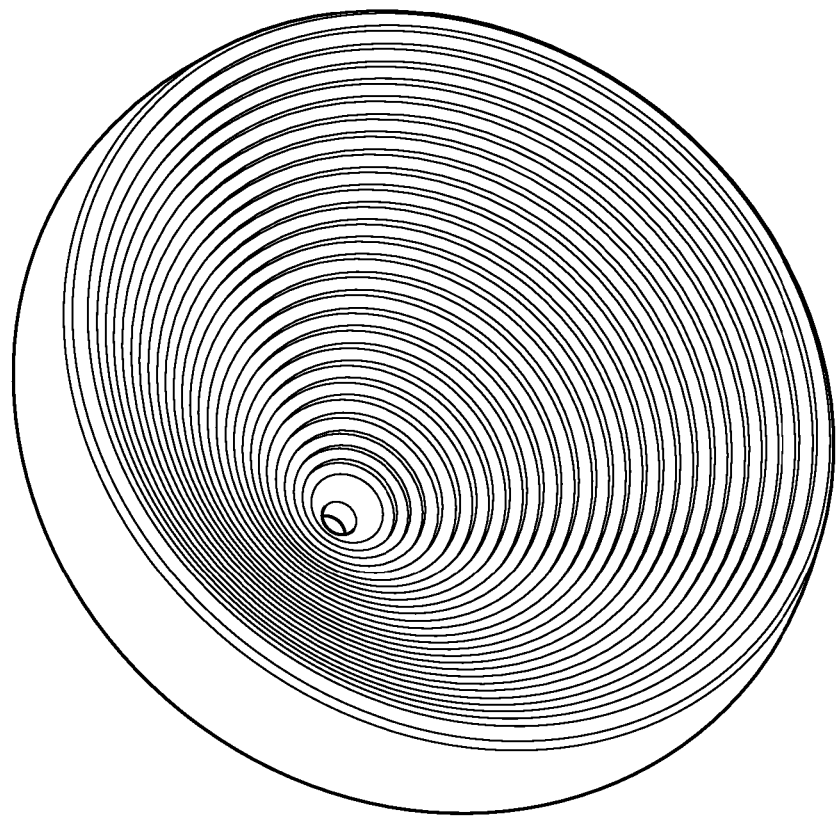

FIG. 7 shows a rotating plate having a bowl shape. In this case the concave reaction surface has a series of concentric grooves between the inner portion and outer edge of the plate. The plate has an aperture located at the centre of the reaction surface. Applying grooves or ridges to the reaction surface enhances mixing and reaction of the feedstock materials.

Figure 8A:
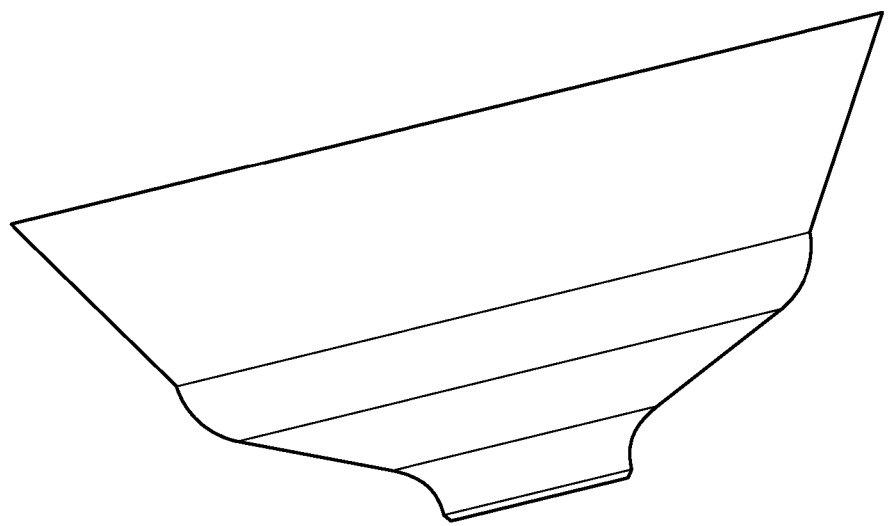
FIG. 8a is a side view of a rotatable plate for use with the apparatus of FIG. 1 or 2.
Figure 8B:
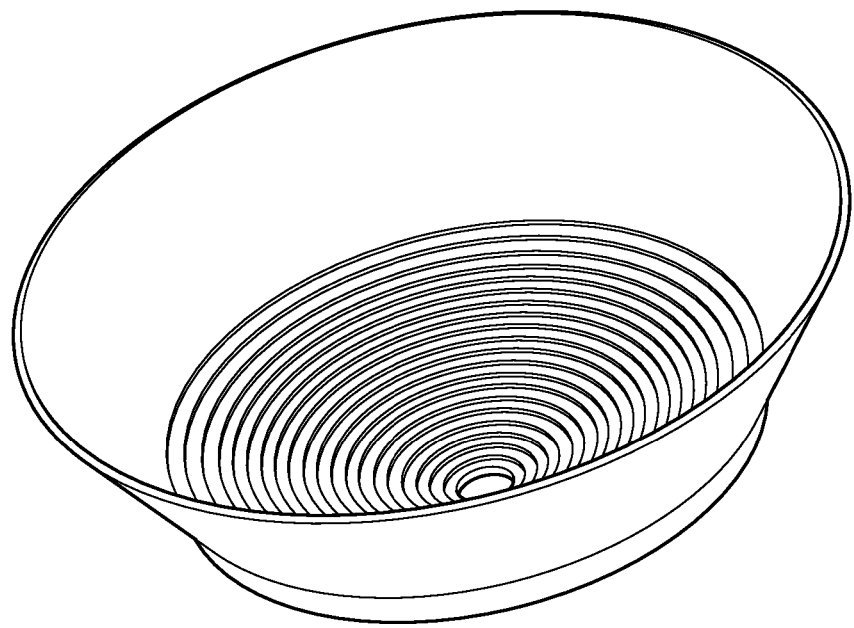
FIG. 8b is a perspective view of a rotatable plate for use with the apparatus of FIG. 1 or 2.

FIG. 8 shows another plate. The concave reaction surface has a bottom portion surrounding the inner portion of the plate and a top portion extending between an outer edge of the bottom portion and the edge of the plate. The plate has an aperture located at the centre of the bottom portion. The surface of the bottom portion includes a plurality of concentric grooves and the surface of the top portion is smooth. The rings or grooves of the bottom part increases fluid mixture and favour the formation of particles. The smooth surface of the top portion allows the particle to grow in size.

Figure 9A:
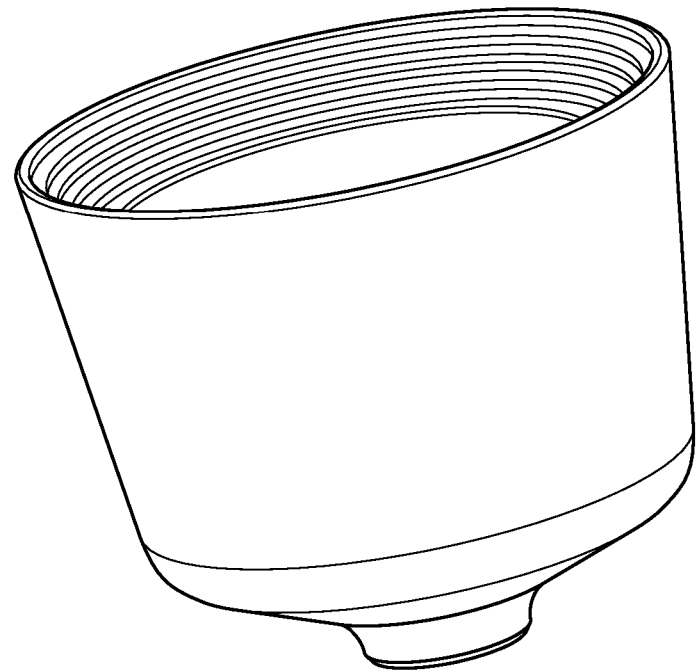
FIG. 9a is a perspective view of a rotatable plate for use with the apparatus of FIG. 1 or 2.
Figure 9B:
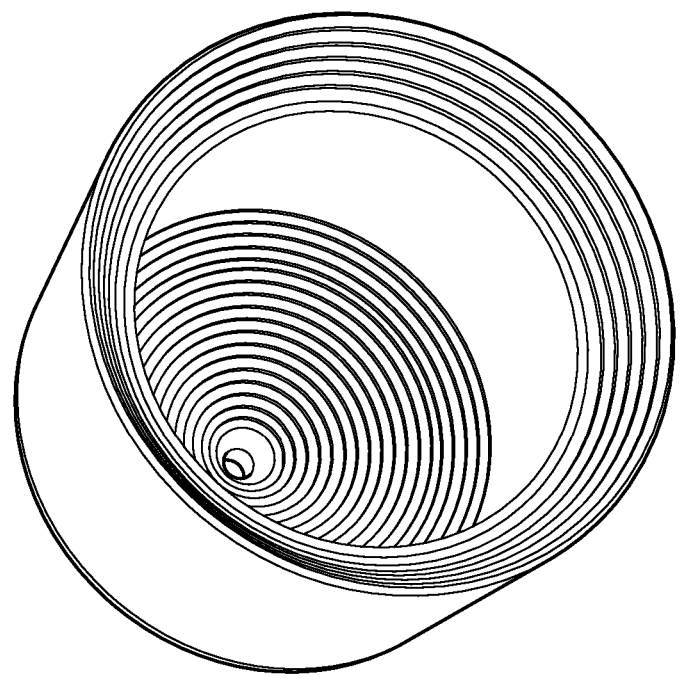

FIG. 9 shows yet another example of a rotating plate. The concave reaction surface has a three portions. A bowl shaped bottom portion surrounding the inner portion of the plate, a tubular middle portion and a top portion extending between an outer edge of the middle portion and the edge of the plate. The plate has an aperture located at the centre of the bottom portion. The surface of the top and bottom portions includes a plurality of concentric grooves while the surface of the middle portion is smooth.

Figure 10A:
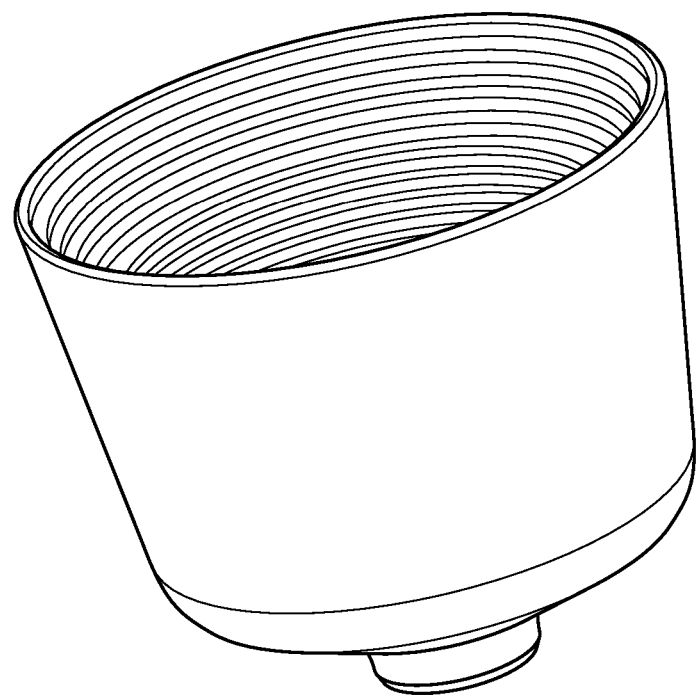
FIG. 10a is a perspective view of a rotatable plate for use with the apparatus of FIG. 1 or 2.
Figure 10B:
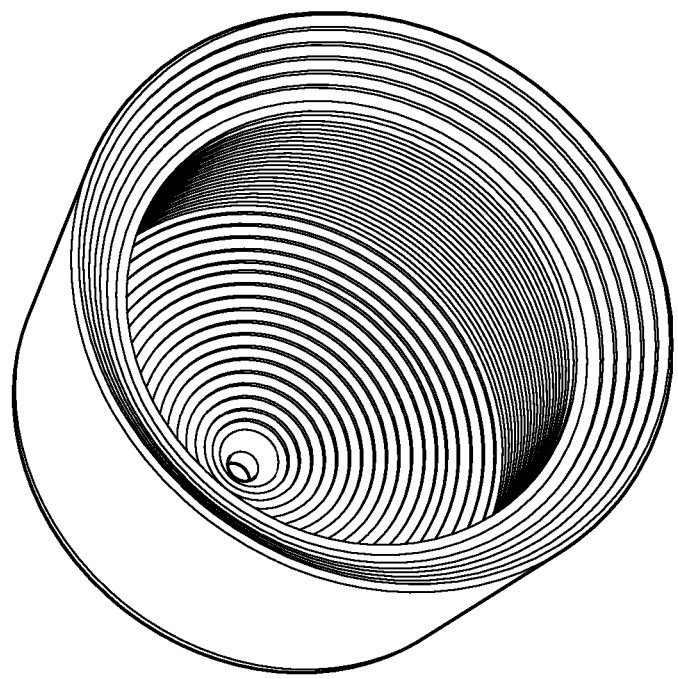

FIG. 10 shows yet another example of a rotating plate. The reaction surface has a three portions. A bowl shaped bottom portion surrounding the inner portion of the plate, a tubular middle portion and a top portion extending between an outer edge of the middle portion and the edge of the plate. The surfaces of the bottom, middle and top portions include a plurality of concentric grooves. The plate has an aperture located at the centre of the bottom portion.

Figure 11A:
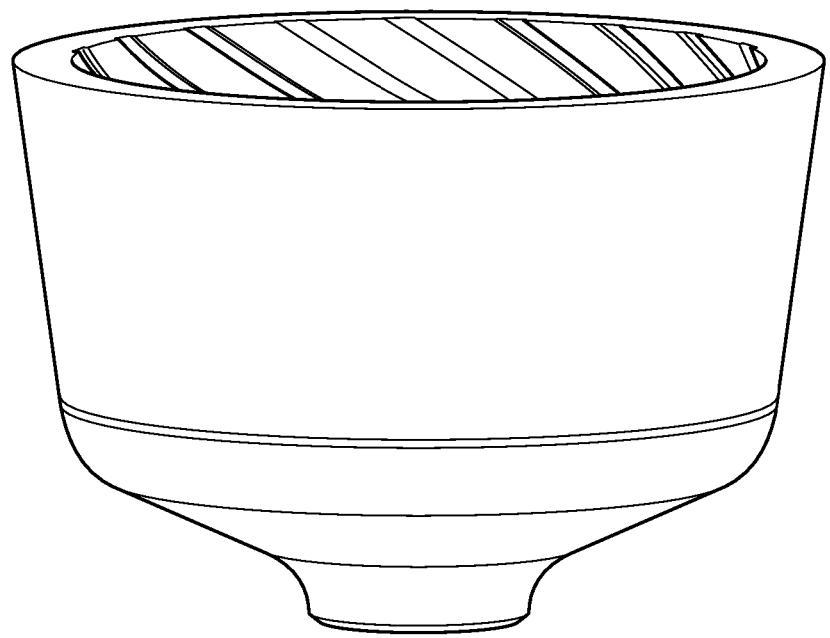
FIG. 11a is a perspective view of a rotatable plate for use with the apparatus of FIG. 1 or 2.
Figure 11B:
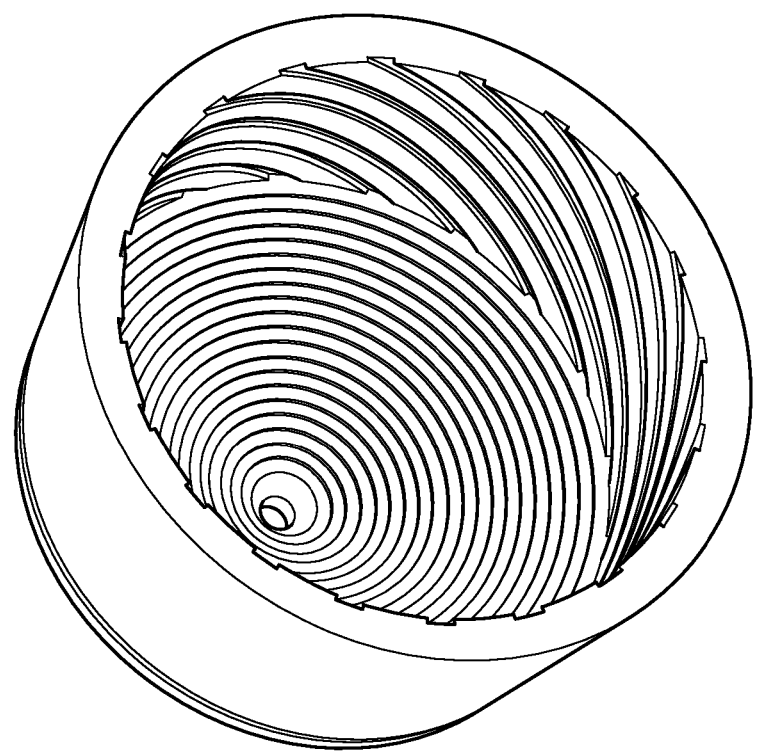

FIG. 11 shows yet another example of a rotating plate. The reaction surface has a bowl shaped bottom portion surrounding the inner portion of the plate and a tubular a top portion extending between an outer edge of the bottom portion and the edge of the plate. The plate has an aperture located at the centre of the bottom portion. The surfaces of the bottom portion includes a plurality of concentric grooves. The surface of the top portion includes a plurality of guide members for guiding the product or particles towards the edge of the plate. When the plate is rotated, the guide members force the particles created in the bottom portion to exit the plate via a specific route defined by the shape of the guide members. This permits to increase the retention time of the particles/product inside the plate.

Figure 12A:
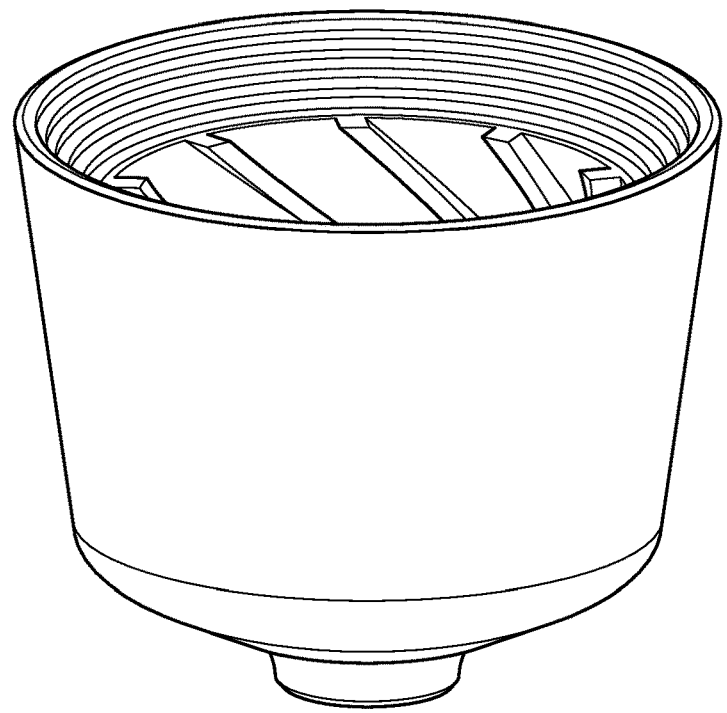
FIG. 12a is a perspective view of a rotatable plate for use with the apparatus of FIG. 1 or 2.
Figure 12B:
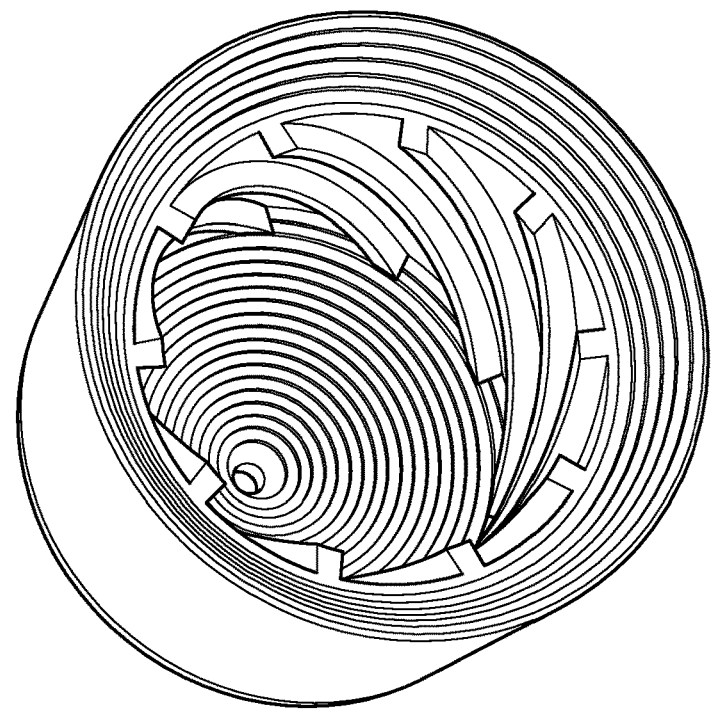

FIG. 12 shows yet another example of a rotating plate. The reaction surface has three portions. A bowl shaped bottom portion surrounding the inner portion of the plate, a tubular middle portion and a top portion extending between an outer edge of the middle portion and the edge of the plate. The surfaces of the bottom and top portions include a plurality of concentric grooves. The surface of the middle portion includes a plurality of guide members for guiding the product or particles towards the top portion. The plate has an aperture located at the centre of the bottom portion.

Figure 13:
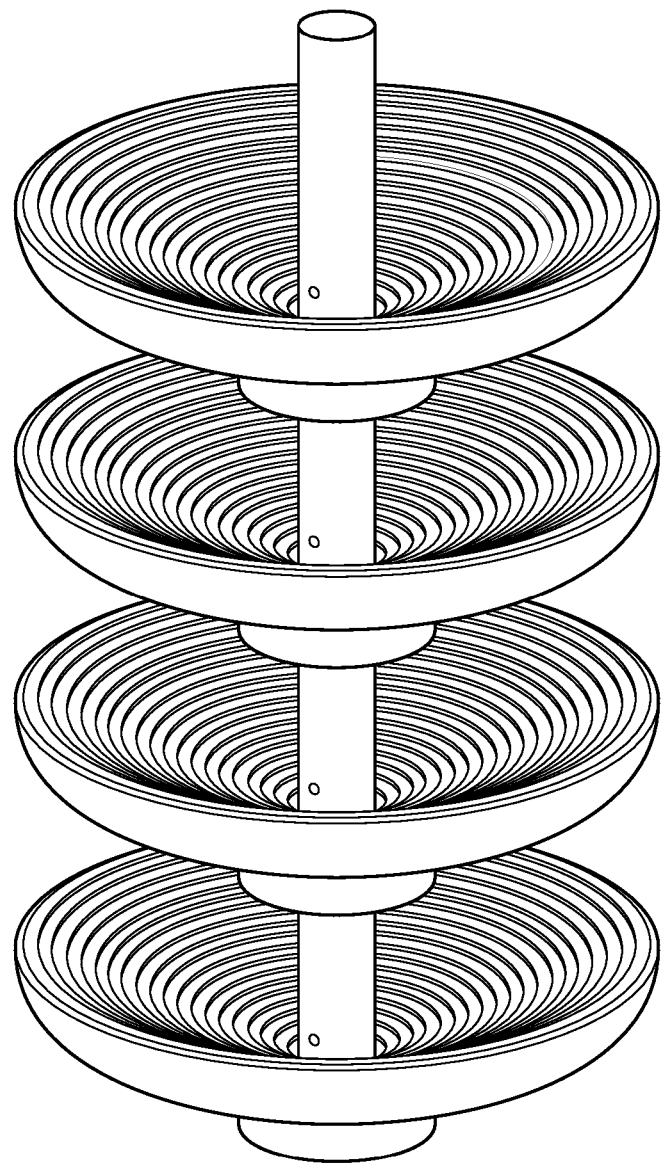
FIG. 13 is an arrangement of four rotatable plates for use with the apparatus of FIG. 1 or 2.

FIG. 13 shows a series of four plates staked on a rod. The rod passes through the aperture of each plate. Such an arrangement can be utilised in order to increase the volume of particles being produced. Alternatively it could also be used in order to produce more complex particles. In this case each plate would be used to produce a specific product.

Figure 14:
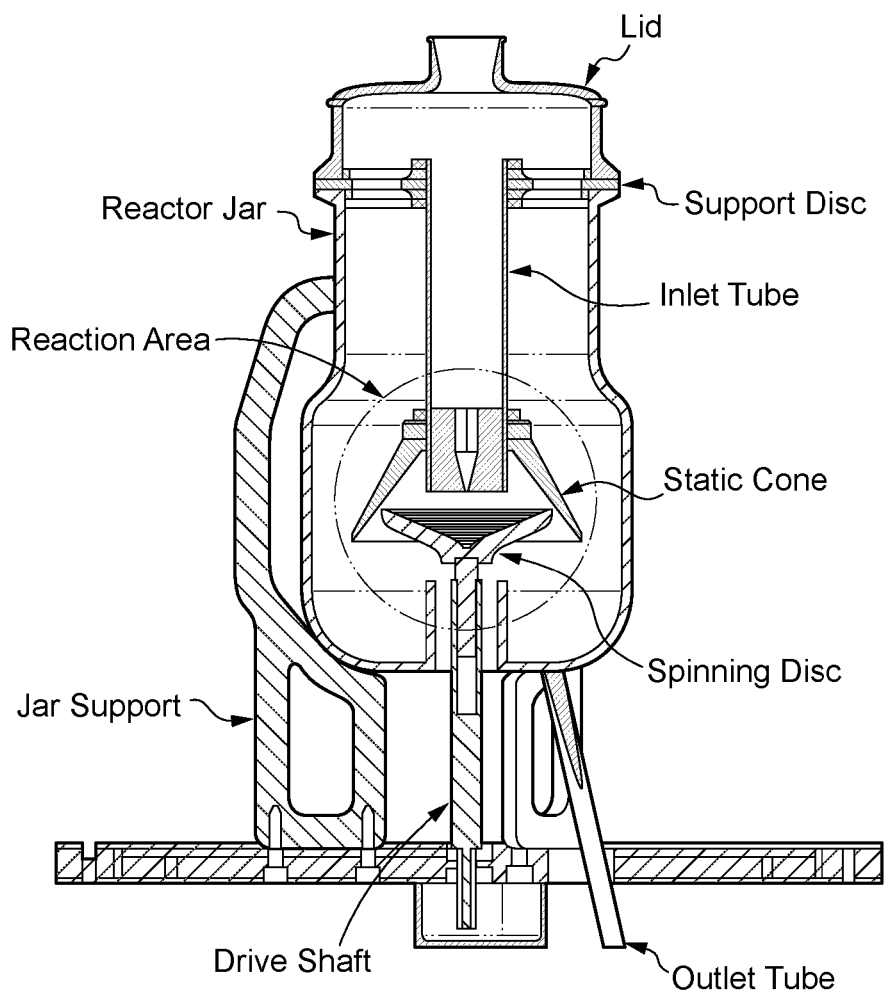
FIG. 14 is a cross section of an exemplary apparatus for producing liquid colloid.

FIG. 14 shows a cross section of a reactor jar supported by a jar support. The figure sows a reaction area formed by the first rotatable plate also referred to as spinning disk and the second plate also referred to as static cone.

Figure 15:
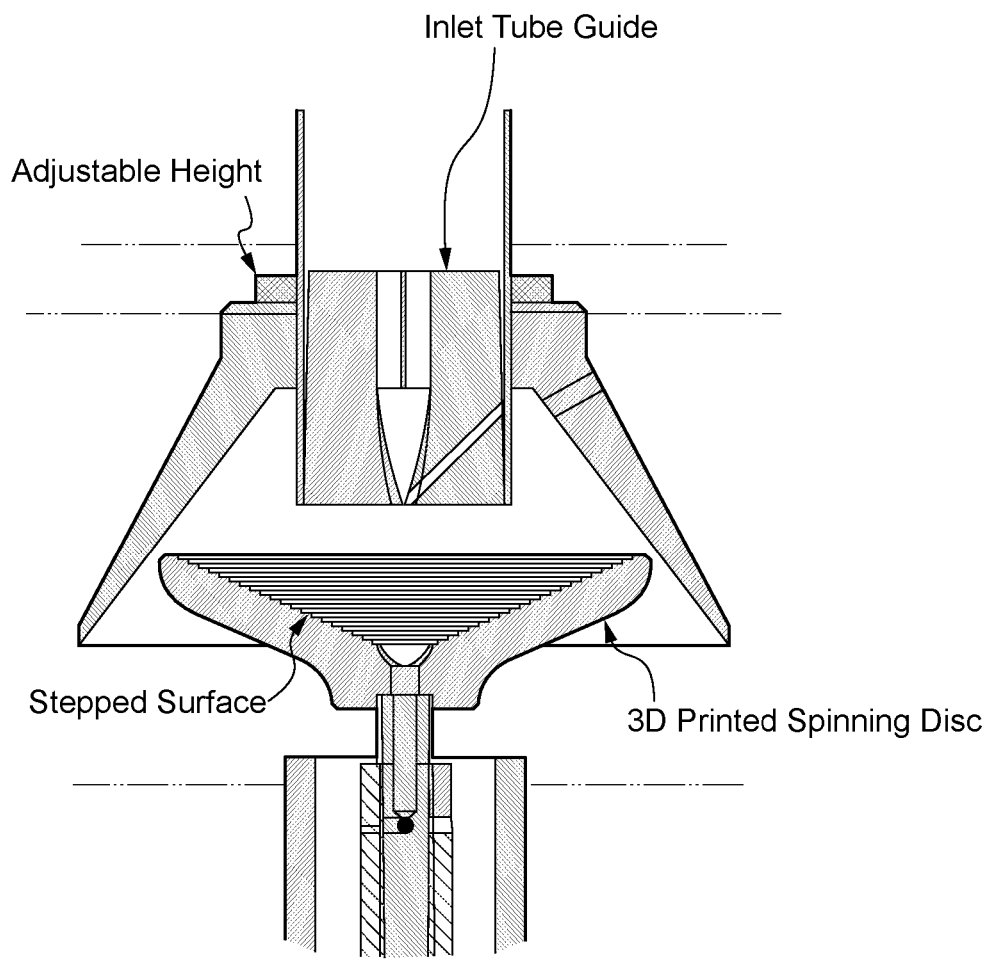
FIG. 15 is a partial enlarged view of the apparatus of FIG. 14.

FIG. 15 shows an enlarged view of the reaction area of FIG. 14. The reaction surface of the first plate has a stepped profile. The second plate has a reaction surface having a flat portion and a side wall portion extending downward from the flat portion. An inlet tube guide extends through the flat portion of the second plate. The height of the second plate can be adjusted.

Figure 16:
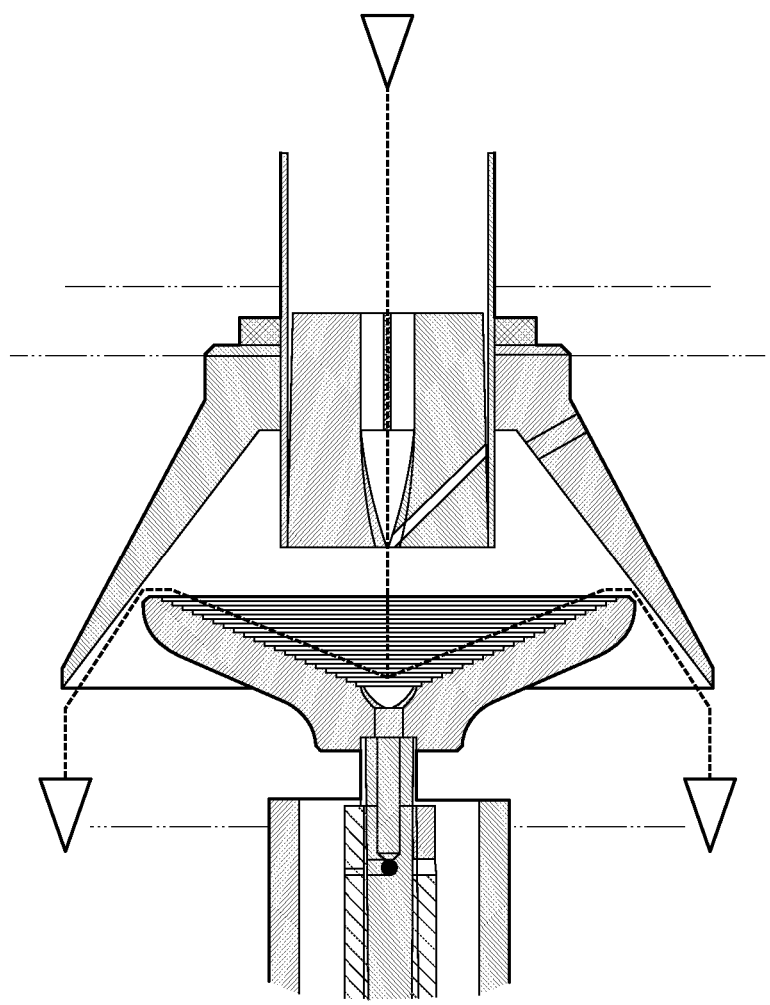
FIG. 16 is a representation of a trajectory of liquid mixture traveling through the apparatus of FIG. 15.

FIG. 16 shows a trajectory of liquid mixture traveling through the reaction area of FIG. 15. In operation, first and second feedstock materials are introduced into the inlet tube guide which direct the materials at or near the centre of the reaction surface of the first rotating plate. The centrifugal force generated by the rotation of the first plate moves the material away from the centre of the plate towards its outer edge. In doing so the first and second feedstock materials mix on the reaction surface of the first plate and form a reaction product, such as a nanoparticulate material. When the mixture is expelled from the outer portion of the reaction surface of the first plate, it then reaches the side wall of the second plate which remains static.

The following examples indicate how nanoparticles have been fabricated using the above described apparatus.

Example 1: $Fe_3O_4$ Nanoparticles

FeCl2.4H2O(s) (50.0 g, 0.25 mol) and FeCl3.6H2O(s) (121.3 g, 0.45 mol) were dissolved in distilled water to make 1.0 l of stock solution. This mixture was fed into a reactor of the form illustrated in FIG. 1 through reactant inlet line 106 at a rate of 50 ml/min. Ammonia Solution (500 ml, 35%, 9.0 mol) was added via reactant inlet line 107 at a rate of 50 m/min. The reactor motor was set to various speeds by varying the applied voltage, as indicated in Table 1 below. The resultant black precipitate was collected from the outlet 113 and washed three times with distilled water and twice with ethyl acetate, filtered under vacuum and air dried to yield a crystalline black powder. Samples were analysed by transmission electron microscopy (TEM) for size and morphology. Observations showed spherical particles, with a particle size distribution and average particle size varying with rotation speed, as also detailed in Table 1.

TABLE 1

Variation of particle size of iron oxide particles with rotational speed.

| Voltage (V) | Spin-rate (rpm) | Particle Size (nm) |
| --- | --- | --- |
| 60 | 350 | 15-30 |
| 80 | 700 | 10-30 |
| 100 | 1000 | 12-35 |
| 120 | 1250 | 10-35 |
| 140 | 1575 | 8-40 |
| 160 | 1820 | 10-35 |
| 180 | 2075 | 10-35 |
| 200 | 2300 | 10-30 |
| 220 | 2450 | 8-25 |
| 240 | 2725 | 7-25 |

Example 2: CaO Nanoparticles

Calcium nitrate tetrahydrate (47.24 g, 0.20 mol), was dissolved in ethylene glycol (1000 ml). In a separate container sodium hydroxide (16.8 g, 0.42 mol) was dissolved in distilled water (100 ml). The two solutions were fed into a reactor of the form in FIG. 1 with feed rates of 20 ml/min and 2 ml/min. The motor was set to 200 rpm. A white precipitate was collected from the outlet 113. The white paste was washed with 500 ml distilled water, sonicated for 60 mins and analysed by TEM for particle size.

TEM results indicates that spherical particles of ~5-10 nm had been formed, and energy dispersive X-ray (EDX) data indicated that these particles were composed of calcium and oxygen in an equal molar ratio.

Other embodiments are intentionally within the scope of the invention as defined by the appended claims.

What is claimed is:

1. An apparatus for producing a liquid colloid, the apparatus comprising:
    a first plurality of concave plates mounted for rotation about a same rotation axis, each plate of the plurality of concave plates providing a concave reaction surface;
    first and second inlet lines arranged to introduce respective first and second liquid feedstock materials to the concave reaction surface of each plate of the plurality of concave plates; and
    a collection unit arranged to collect a reaction product formed from reaction of the first and second liquid feedstock materials as a liquid colloid ejected from an outer edge of each plate of the plurality of concave plates.

2. The apparatus of claim 1 wherein each concave reaction surface of each plate of the plurality of concave plates faces in a same direction.

3. The apparatus of claim 1 further comprising a side wall portion extending from the concave portion reaction surface of each plate of the plurality of concave plates.

4. The apparatus of claim 3 wherein each concave reaction surface of each plate of the plurality of concave plates faces in a same direction.

5. The apparatus of claim 3 wherein the concave reaction surface of each plate of the plurality of concave plates comprises a plurality of concentric grooves.

6. The apparatus of claim 5 wherein each concave reaction surface of each plate of the plurality of concave plates faces in a same direction.

7. The apparatus of claim 3, wherein the side wall portion comprises a surface comprising at least one groove.

8. The apparatus of claim 7 wherein each concave reaction surface of each plate of the plurality of concave plates faces in a same direction.

9. The apparatus of claim 3, wherein the side wall portion is conical.

10. The apparatus of claim 9 wherein each concave reaction surface of each plate of the plurality of concave plates faces in a same direction.

11. The apparatus of claim 9 wherein the concave reaction surface of each plate of the plurality of concave plates comprises a plurality of concentric grooves.

12. The apparatus of claim 11 wherein each concave reaction surface of each plate of the plurality of concave plates faces in a same direction.

13. The apparatus of claim 9, wherein the side wall portion comprises a surface comprising at least one groove.

14. The apparatus of claim 13 wherein each concave reaction surface of each plate of the plurality of concave plates faces in a same direction.

15. The apparatus of claim 1 wherein the concave reaction surface of each plate of the plurality of concave plates comprises a plurality of concentric grooves.

16. The apparatus of claim 15 wherein each concave reaction surface of each plate of the plurality of concave plates faces in a same direction.

17. The apparatus of claim 1 wherein each plate of the plurality of concave plates is mounted to an end of a rotatable axle for rotation about the rotation axis.

18. The apparatus of claim 17 wherein each concave reaction surface of each plate of the plurality of concave plates faces in a same direction.

19. The apparatus of claim 17 wherein the first and/or second inlet lines extend along the rotatable axle.

20. The apparatus of claim 19 wherein each concave reaction surface of each plate of the plurality of concave plates faces in a same direction.

* * * * *